US009992719B2

(12) United States Patent
Melin et al.

(10) Patent No.: US 9,992,719 B2
(45) Date of Patent: Jun. 5, 2018

(54) DETECTION OF NEIGHBOR CELL RELATION

(71) Applicant: Telefonaktiebolaget LM Ericsson (publ), Stockholm (SE)

(72) Inventors: Lena Melin, Vaxholm (SE); Sofia Brismar, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/309,932

(22) PCT Filed: Jun. 18, 2014

(86) PCT No.: PCT/SE2014/050754
§ 371 (c)(1),
(2) Date: Nov. 9, 2016

(87) PCT Pub. No.: WO2015/195009
PCT Pub. Date: Dec. 23, 2015

(65) Prior Publication Data
US 2017/0188276 A1 Jun. 29, 2017

(51) Int. Cl.
*H04W 36/00* (2009.01)
*H04W 36/04* (2009.01)
(Continued)

(52) U.S. Cl.
CPC ........... *H04W 36/04* (2013.01); *H04W 24/10* (2013.01); *H04W 36/0083* (2013.01);
(Continued)

(58) Field of Classification Search
None
See application file for complete search history.

(56) References Cited

U.S. PATENT DOCUMENTS

2011/0080894 A1 4/2011 Iwamura et al.
2012/0315895 A1 12/2012 Jovanovic et al.
(Continued)

FOREIGN PATENT DOCUMENTS

WO 2014011091 A1 1/2014

OTHER PUBLICATIONS

3rd Generation Partnership Project, "3rd Generation Partnership Project; Technical Specification Group GSM/EDGE Radio Access Network; Mobile Switching Centre—Base Station System (MSC-BSS) interface; Layer 3 specification (Release 11);" 3GPP TS 48.008 V11.7.0, pp. 1-227, Sophia Antipolis Valbonne, France, Nov. 2013.
(Continued)

*Primary Examiner* — Erika Washington
(74) *Attorney, Agent, or Firm* — Sage Patent Group

(57) ABSTRACT

There is provided a method, performed by a network node (e.g. an RNC), for detecting a neighbor cell relation between different radio access technologies in a cellular communication network. The method comprises the step (S1) of triggering a User Equipment, UE, served in a first cell of a first radio access technology (e.g. WCDMA cell) under the control of the network node (e.g. RNC), to perform a cell selection process by initiating a connection release with redirection to a second radio access technology (e.g. GSM), causing the UE to select a second cell of the second radio access technology (e.g. GSM cell). The method also comprises the step (S2) of receiving information representing the identity of the second cell selected by the UE (e.g. CGI), and the step (S3) of identifying, based on the received information representing the identity of the second cell and information representing the identity of the first cell, a neighbor cell relation between the first cell and the second cell. In this (Continued)

way, an efficient way of detecting a neighbor cell relation between different radio access technologies is provided.

16 Claims, 10 Drawing Sheets

(51) Int. Cl.
   *H04W 76/04* (2009.01)
   *H04W 24/10* (2009.01)
   *H04W 88/12* (2009.01)
   *H04W 88/02* (2009.01)

(52) U.S. Cl.
   CPC ......... *H04W 76/046* (2013.01); *H04W 76/27* (2018.02); *H04W 88/02* (2013.01); *H04W 88/12* (2013.01)

(56) References Cited

U.S. PATENT DOCUMENTS

| | | | |
|---|---|---|---|
| 2013/0295915 A1 | 11/2013 | Nakamata et al. | |
| 2014/0004862 A1* | 1/2014 | Ekemark | H04W 72/06 455/443 |
| 2014/0073306 A1 | 3/2014 | Shetty et al. | |

OTHER PUBLICATIONS

3rd Generation Partnership Project, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12)," 3GPP TS 48.018 V12.2.0; pp. 1-190, Sophia Antipolis Valbonne, France, Mar. 2014.

3rd Generation Partnership Project, "3rd Generation Partnership Project; Technical Specification Group GSM/EDGE Radio Access Network; Mobile radio interface layer 3 specification; Radio Resource Control (RRC) protocol (Release 12)," 3GPP TS 44.018 V12.2.0, pp. 1-467, Sophia Antipolis Valbonne, France, Mar. 2014.

3rd Generation Partnership Project, "3rd Generation Partnership Project; Technical Specification Group Core Network and Terminals; Mobile radio interface Layer 3 specification; Core network protocols; Stage 3 (Release 12)," 3GPP TS 24.008 V12.5.0, pp. 1-691, Sophia Antipolis Valbonne, France, Mar. 2014.

3rd Generation Partnership Project, "3rd Generation Partnership Project; Technical Specification Group Radio Access Network; UTRAN Iu interface Radio Access Network Application Part (RANAP) signalling (Release 12)," 3GPP TS 25.413 V12.1.0; pp. 1-443, Sophia Antipolis Valbonne, France, Mar. 2014.

3rd Generation Partnership Project, "3rd Generation Partnership Project; Technical Specification Group Radio Access Network; Radio Resource Control (RRC); Protocol specification (Release 12), 3GPP TS 25.331 V12.1.0," pp. 1-2120, Sophia Antipolis Valbonne, France, Mar. 2014.

3rd Generation Partnership Project, "3rd Generation Partnership Project; Technical Specification Group Radio Access Network; Automatic Neighbour Relation (ANR) for UTRAN; Stage 2 (Release 10), 3GPP TS 25.484 V10.2.0," pp. 1-20, Sophia Antipolis Valbonne, France, Sep. 2012.

3rd Generation Partnership Project, "3rd Generation Partnership Project; Technical Specification Group Radio Access Network; Radio Resource Control (RRC); Protocol specification (Release 10), 3GPP TS 25.331 V10.15.0," pp. 1-1903, Sophia Antipolis Valbonne, France, Mar. 2014.

3rd Generation Partnership Project, "3rd Generation Partnership Project; Technical Specification Group Core Network and Terminals; Mobile radio interface Layer 3 specification; Core network protocols; Stage 3 (Release 10)," 3GPP TS 24.008 V10.13.0, pp. 1-651, Sophia Antipolis Valbonne, France, Mar. 2014.

3rd Generation Partnership Project, "3rd Generation Partnership Project; Technical Specification Group Radio Access Network; User Equipment (UE) procedures in idle mode and procedures for cell reselection in connected mode (Release 10)," 3GPP TS 25.304 V10.7.0, pp. 1-52, Sophia Antipolis Valbonne, France, Dec. 2012.

3rd Generation Partnership Project, "3rd Generation Partnership Project; Technical Specification Group Radio Access Network; UTRAN Iu interface Radio Access Network Application Part (RANAP) signalling (Release 10)," 3GPP TS 25.413 V10.10.0, pp. 1-428, Sophia Antipolis Valbonne, France, Jun. 2013.

Ericsson et al, "Method for ANR support in UTRAN," 3GPP TSG RAN WG2 #72, R2-106442, Jacksonville, Florida, USA, Nov. 15-19, 2010, pp. 1-13.

Nokia Siemens Networks, Nokia Corporation, "ANR Measurements and Triggering," 3GPP TSG-RAN WG2 Meeting #71, R2-104526, Madrid, Spain, Aug. 23-27, 2010, pp. 1-5.

Nokia Siemens Networks, "Implementation of Cell Reselection Scheme for Intra-3G ANR," 3GPP TSG-RAN WG3 Meeting #70, R3-103558, Jacksonville, US, Nov. 15-20, 2010, pp. 1-7.

\* cited by examiner

DETECTION OF NEIGHBOR CELL RELATION

TECHNICAL FIELD

The proposed technology generally relates to a method for detecting a neighbor cell relation between different radio access technologies, and a corresponding network node, apparatus, computer program and a computer program carrier.

BACKGROUND

Later generations of cellular communication networks are renowned for their complexity. A large amount of wireless devices and User Equipment's should be able to communicate with each other and with relevant network nodes as seamless as possible. The complexity related to the management of such networks has created an urge to design network solutions where the demands on management are softened. As an example, the evolution of Self-Organized Networks, SONs, has become an important feature to achieve such a simplification of network management. The development of SONs is, beside the potentially overarching aim to reduce the complexity, also important when considering the need for heterogeneous networks and for optimizing, e.g. Wideband Code Division Multiple Access, WCDMA, Radio Access Network, RAN, for the next wave of mass-market operators.

An important feature in modern and future cellular communication networks, in general, and the development of SONs, in particular, is related to the management of neighbor cell relations. The management of neighbor cell relations can be seen as an important cornerstone in order to achieve efficient Self Organized Networks, SON. Moreover, if such neighbor cell relations can be automatically generated this would, aside from lowering installation and operation costs for operators, also improve the Key Performance Indicator, KPI, called retainability. The technology behind automatically generated neighbor cell relations is generally referred to as Automatic Neighbor Relations, ANR, and such neighbor cell relations are often maintained in one or more databases; for example in a neighbor cell list or, equivalently, a neighbor cell table or other suitable representation.

It would be highly desirable if a network node had an at least satisfactory knowledge about the neighbor cell relations between the cells within the network since this would make a lot of the operations that are managed by, or under the control of, the network node more robust. For example, some standardized network solutions even require information of neighbor cell relations for proper network operation. A possible example of an operation that would benefit from neighbor cell information is the handover of a User Equipment between different cells. Knowledge about neighbor cell relations would, for example, reduce the amount of dropped calls during handover. It would also facilitate the management of the network, for example, by making manually performed additions of neighbor cell relations more or less redundant. Since a cellular communication network in general is gradually evolving over time, new neighbor cells will frequently be added to the cellular communication network and new interference patterns among the cells will emerge. In order for the network node to maintain relevant information about neighbor cell relations, measures are needed that will enable a network node to update its knowledge about neighbor cell relations between cells through the means of detecting missing neighbor cell relations.

A problem is that manual configuration of neighbor cell relations takes a lot of time for operators. In light of this, the design of efficient mechanisms that are able to automatically detect missing neighbor cell relations has become increasingly important and several different measures have been proposed.

In one of the known methods, the User Equipment, UE, reports detected cells to the Radio Network Controller, RNC. The RNC may order the UE to measure and report missing cells, i.e. cells that are not already defined in a neighbor cell list. The order is sent to the UE in a MEASUREMENT CONTROL message together with other measurement control information such as event/reporting criteria, neighbor cell list, measurement quantities, and measurement command(s). The UE will apply the same measurement control information on all cells, i.e. both detected set cells and cells listed in a neighbor cell list. If a detected set cell triggers a measurement event the UE will send a MEASUREMENT REPORT message to the RNC. The RNC will evaluate the MEASUREMENT REPORT message to find out if the reported cell is already defined as a neighbor or not. If not, it can be added as a new neighbor relation.

However, this method does not work for certain radio access technologies and cells such as GSM cells, since detected set reporting for GSM cells, for example, does not exist.

ANR logging has been proposed as an optional feature to detect missing neighbor relations [1]. When the feature is activated the User Equipment, UE, will measure and record detected set cells in Idle mode, UTRAN Registration Area Paging Channel, URA_PCH, state and Cell Paging Channel, CELL_PCH, state. The report can be retrieved by the Radio Network Controller, RNC, when the UE becomes active, i.e. when the UE is in Cell Dedicated Channel, CELL_DCH, and Cell Forward Access Channel, CELL_FACH, state. Each report contains up to four missing relations detected by the UE. The UE may log and report Intra-frequency, IAF, Interfrequency, IEF, Long Term Evolution, LTE and Global Systems for Mobile communications, GSM, relations.

As indicated, the UE support for ANR logging is an optional 3GPP feature and thus it is difficult to predict how many UEs that will actually support ANR logging in the future.

Another possible method to find GSM neighbor cells relates to GSM and measurements on unknown cells, so-called "ghost cells". The UE is then ordered to measure on unknown cells not defined as neighbor relations, but with possible combinations of Broadcast Control Channel, BCCH, and Base Station Identity Code (BSIC) that exist in the network. If the UE measure on "ghost cell" but finds and reports a real cell, a new neighbor relation can be defined to this cell from the source cell. Although this solution could work quite satisfactory, there is still room for improvements.

WO 2014/011091 relates to a technique for updating neighbor cell relations in a cellular communication network. A User Equipment, UE, switches from being served in a source cell by a source base station to being served in a target cell by a target base station. The UE sends an identifier of the source cell and a request for a mobility report to the target base station. The target base station sends a mobility report to the source base station. The mobility reporting that a successful switch has taken place between the source cell and the target cell enables updating of the neighbor cell relations based on the mobility report.

SUMMARY

The proposed technology aims to provide mechanisms that at least partially overcome some of the drawbacks within the art and ensures an efficient detection of a neighbor cell relation between cells in a cellular communication network.

It is a specific object to provide a method, performed by a network node, for detecting a neighbor cell relation between different radio access technologies.

It is another specific object to provide a network node configured to detect a neighbor cell relation between different radio access technologies.

It is also a specific object to provide an apparatus configured to detect a neighbor cell relation between different radio access technologies.

Yet another specific object is to provide a computer program comprising instructions, which when executed by at least one processor, cause the at least one processor to detect a neighbor cell relation between cells of different radio access technologies.

Still another specific object is to provide a carrier comprising such a computer program.

It is a further specific object to provide a network node for detecting a neighbor cell relation between different radio access technologies.

These and other objects are met by at least one embodiment of the proposed technology.

According to a first aspect there is provided a method, performed by a network node, for detecting a neighbor cell relation between different radio access technologies in a cellular communication network. The method comprises the steps of:
  triggering a User Equipment, UE, served in a first cell of a first radio access technology under the control of the network node, to perform a cell selection process by initiating a connection release with redirection to a second radio access technology, causing the UE to select a second cell of the second radio access technology;
  receiving information representing the identity of the second cell selected by the UE; and
  identifying, based on the received information representing the identity of the second cell and information representing the identity of the first cell, a neighbor cell relation between the first cell and the second cell.

In this way, an efficient way of detecting a neighbor cell relation between different radio access technologies is provided.

According to a second aspect there is provided a network node configured to detect a neighbor cell relation between different radio access technologies in a cellular communication network. The network node is configured to trigger a User Equipment, UE, served in a first cell of a first radio access technology under the control of the network node, to perform a cell selection process by initiating a connection release with redirection to a second radio access technology, causing the UE to select a second cell of the second radio access technology. The network node is configured to receive information representing the identity of the second cell selected by the UE. The network node is configured to identify, based on the received information representing the identity of the second cell and information representing the identity of the first cell, a neighbor cell relation between the first cell and the second cell.

According to a third aspect there is provided an apparatus configured to detect a neighbor cell relation between different radio access technologies in a cellular communication network. The apparatus comprises a processor and a memory, the memory comprising instructions executable by the processor, whereby the processor is operative to:
  trigger a User Equipment, UE, served in a first cell of a first radio access technology, to perform a cell selection process by initiating a connection release with redirection to a second radio access technology, causing the UE to select a second cell of the second radio access technology;
  read information representing the identity of the second cell selected by the UE; and
  identify, based on the information representing the identity of the second cell and information representing the identity of the first cell, a neighbor cell relation between the first cell and the second cell.

According to a fourth aspect there is provided a computer program comprising instructions, which when executed by at least one processor, causes the at least one processor to:
  trigger a User Equipment, UE, served in a first cell of a first radio access technology, to perform a cell selection process by initiating a connection release with redirection to a second radio access technology, causing the UE to select a second cell of the second radio access technology;
  read information representing the identity of the second cell selected by the UE; and
  identify, based on the information representing the identity of the second cell and information representing the identity of the first cell, a neighbor cell relation between the first cell and the second cell.

According to a fifth aspect there is provided a carrier comprising the computer program of the fourth aspect. By way of example, the carrier may be one of an electronic signal, an optical signal, an electromagnetic signal, a magnetic signal, an electric signal, a radio signal, a microwave signal, and a computer-readable storage medium.

According to a sixth aspect there is provided a network node for detecting a neighbor cell relation between different radio access technologies in a cellular communication network. The network node comprises:
  an initiating module for triggering a User Equipment, UE, served in a first cell of a first radio access technology under the control of the network node, to perform a cell selection process by initiating a connection release with redirection to a second radio access technology, causing the UE to select a second cell of the second radio access technology;
  a reading module for reading information representing the identity of the second cell selected by the UE; and
  an identification module for identifying, based on the information representing the identity of the second cell and information representing the identity of the first cell, a neighbor cell relation between the first cell and the second cell.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
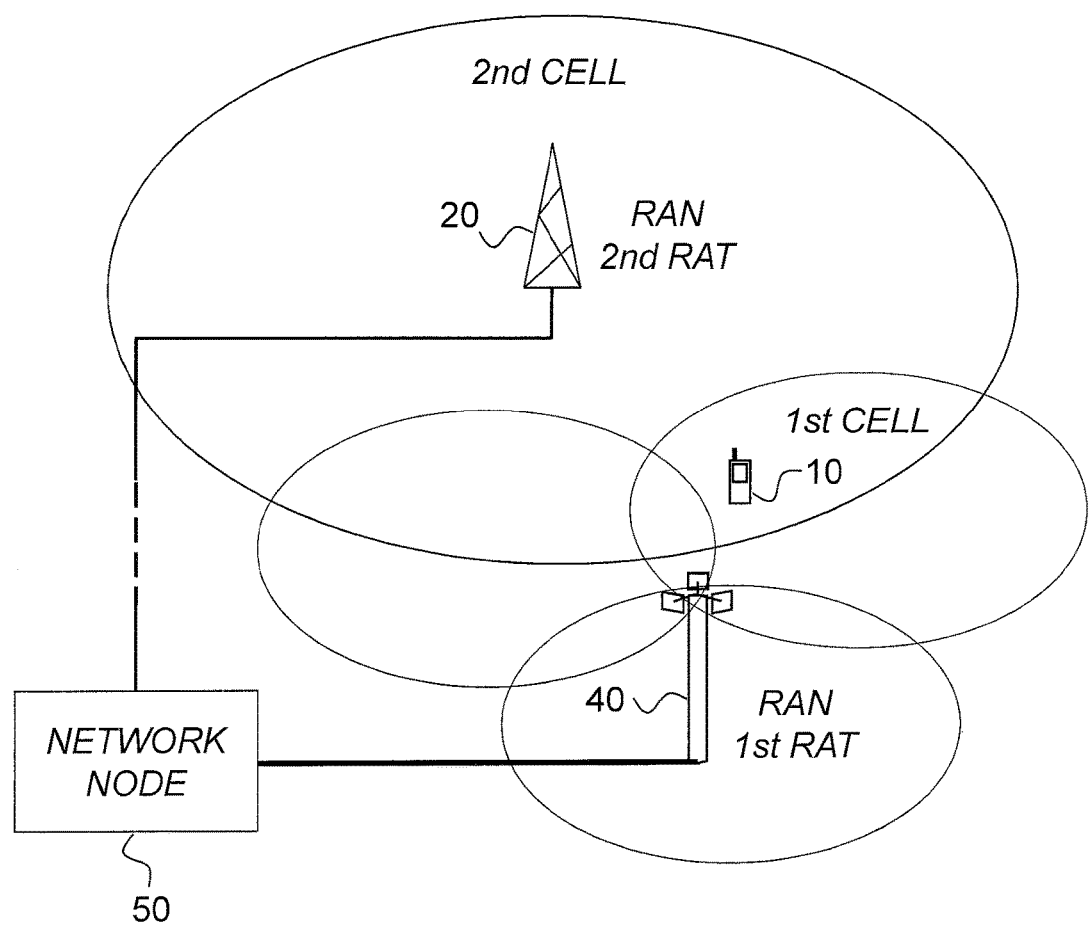
FIG. 1 is a schematic simplified diagram illustrating an example of a cellular communication network operating according to at least two different radio access technologies.

For a better understanding of the proposed technology, it may be useful to begin with a brief overview of a cellular communication network operating according to at least two different radio access technologies with reference to the particular example of FIG. 1.

In this example, the overall cellular communication network comprises base stations or access points 20, 40 for Radio Access Networks, RANs, of different Radio Access Technologies, RATs. Base station 40, located in a first RAN, operates according to a first RAT and has a number of cells, at least one of which serves one or more User Equipments, UEs, such as UE 10. In this example, the UE 10 is initially served by one or more cells, including a first cell. Base station 20, located in a second RAN, operates according to a second RAT and also has a number of cells, including at least a second cell. In the cellular communication network, the base stations 20, 40 may be connected to a network node 50. By way of example, the network node 50 may be responsible for controlling at least one of the base stations. The network node 50 may also be responsible for detecting and/or managing neighbor cell relations, as will be explained below.

Figure 2:
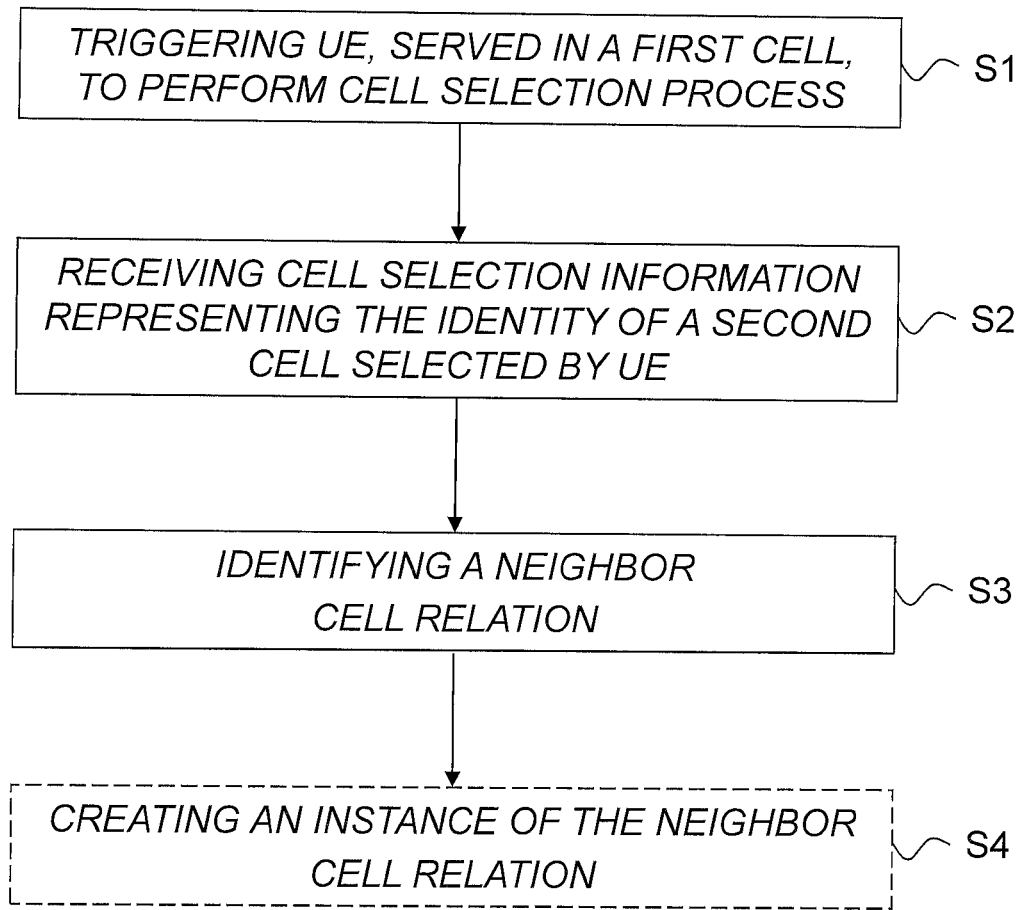
FIG. 2 is a schematic flow diagram illustrating an example of a method, performed by a network node, for detecting a neighbor cell relation between different radio access technologies in a cellular communication network according to an embodiment.

FIG. 2 is a schematic flow diagram illustrating an example of a method, performed by a network node, for detecting a neighbor cell relation between different radio access technologies in a cellular communication network according to an embodiment. The method basically comprises the steps of:

S1: triggering a User Equipment, UE, served in a first cell of a first radio access technology under the control of the network node, to perform a cell selection process by initiating a connection release with redirection to a second radio access technology, causing the UE to select a second cell of the second radio access technology;

S2: receiving information representing the identity of the second cell selected by the UE; and S3: identifying, based on the received information representing the identity of the second cell and information representing the identity of the first cell, a neighbor cell relation between the first cell and the second cell.

The proposed technology thus provides an efficient way of detecting a neighbor cell relation between different radio access technologies.

In this way, it is possible to provide an efficient ANR solution. Such a solution for automatically creating neighbor relations is very useful for mobile system operators since they save efforts for operation and maintenance.

Manual neighbor planning is of course cumbersome and costly. The proposed technology therefore alleviates the need for manual configuration of new cells or neighbor relations. No manual configuration of initial search conditions is needed.

The proposed technology does not require any changes in UE implementation. The technology does not require the UE to perform any additional measurements in active mode, and hence compressed mode is not needed.

By way of example, the neighbor cell relation may be identified by checking whether the second cell is defined as a neighbor cell of the first cell, and if the second cell is not defined as a neighbor cell, identifying the second cell as a neighbor cell of the first cell. This may for example be effectuated by checking existing neighbor cell relations in a neighbor cell list or equivalent representation of the neighbor cell relations.

In an optional embodiment, the network node may also create an instance of the identified neighbor cell relation between the first cell and the second cell, as indicated by the optional step S4 in FIG. 2. As will be exemplified later on, although the actual neighbor cell relation may be detected by the network node, an instance of the neighbor cell relation may be created and/or managed in another network component such as an Operations Support System or similar network management system in another part of the network. By way of example, the instance of the neighbor cell relation may be created as an entry representing the neighbor cell relation in a neighbor cell list, as will be explained in more detail later on.

As an example, the network node may elect the first cell, from a number of cells serving the UE, to act as a basis relative to which a neighbor cell relation should be identified. With reference to the example of FIG. 1, this means that the UE 10 may actually be served by a number of cells of the base station 40. The network node 50 may elect one of the cells, e.g. the cell denominated the first cell in FIG. 1 relative to which new neighbor cell relations should be detected or identified.

Figure 3:
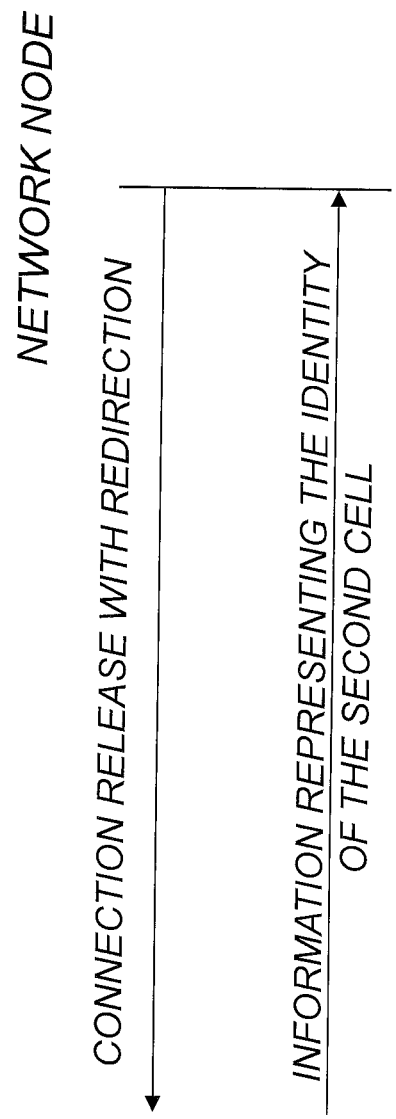
FIG. 3 is a schematic simplified signaling diagram illustrating an example of signaling in relation to a network node according to an embodiment.

FIG. 3 is a schematic simplified signaling diagram illustrating an example of signaling in relation to a network node according to an embodiment. In this example, the network node sends a connection release message towards the UE.

Normally, this message is transferred to the UE via the radio base station, but in the control plane transparently to the base station.

Ultimately, the network node receives information, also referred to as cell identity information, representing the identity of the second cell selected by the UE. By way of example, this information may originate from an appropriate node, depending on the radio access technology, in the radio access network of the second cell, and may be transferred via the core network.

In an optional embodiment, the connection release is initiated by sending a connection release message without indicating any target cell in the connection release message. In this way, a more open selection of cell(s) is allowed. It should though be understood that the selection of cell(s) may be limited to cells operating in a certain frequency interval, or other suitable constraint, but it is not desirable to restrict the redirection to a single target cell.

As an example, the network may trigger the UE to perform the cell selection process by initiating a Radio Resource Control, RRC, Connection Release procedure using redirection information to the other radio access network of the second radio access technology.

RRC is a protocol that belongs to the Universal Mobile Telecommunications System, UMTS, Wideband Code Division Multiple Access, WCDMA, protocol stack and normally handles the control plane signaling between UEs and the radio access network.

In a particular example, the connection release is initiated by sending a RRC Connection Release message including redirection information for redirection to the second radio access technology.

By way of example, the network node may trigger the UE to perform the cell selection process at inactivity to avoid disturbing the end-users.

In an optional embodiment, the network node may initiate the connection release, while keeping an Iu connection to the core network and UE context with information on the first cell and UE identity, and release the Iu connection after UE connection establishment in the second cell.

According to a particular example, the network node may be a Radio Network Controller, RNC.

For example, the different radio access technologies may include any pair of GRAN/GERAN, UTRAN and E-UTRAN, where GRAN stands for GSM Radio Access Network, GERAN stands for GSM EDGE Radio Access Network, UTRAN stands for UMTS Terrestrial Radio Access Network and E-UTRAN stands for Evolved UTRAN.

For a better understanding of the network components that may be involved in the procedures of at least one embodiment of the proposed technology, a non-limiting example of a network architecture including an access network part and a core network part will now be described with reference to FIG. 4.

Figure 4:
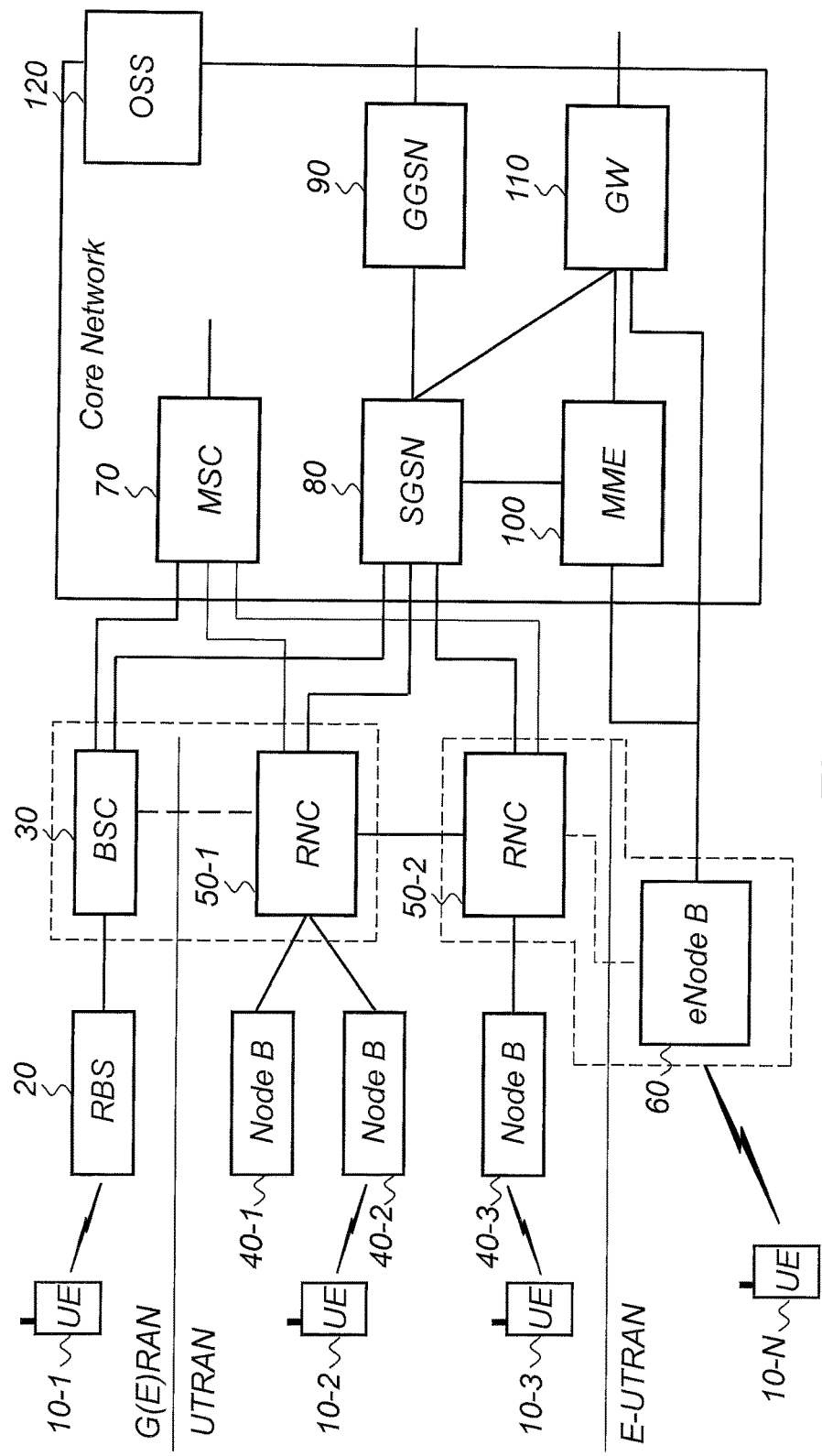
FIG. 4 is a schematic diagram illustrating an example overview of a network architecture including an access network part and a core network part according to an embodiment.

In the particular example of FIG. 4, the access network part relates to more than one radio access technology. In this example, radio access networks based on G(E)RAN, UTRAN and E-UTRAN are illustrated. It should be understood that the proposed technology may relate to any pair of these access technologies.

The radio access networks serve a number of UEs 10-1 to 10-N, where N is an integer equal to or greater than 1.

In G(E)RAN, the access network is based on one or more Radio Base Stations, RBSs, 20 connected to one or more Base Station Controllers, BSCs 30. The BSC 30 may be connected to the core network, e.g. to a Mobile Switching Center, MSC, 70, and a Serving GPRS Support Node, SGSN 80.

In UTRAN, the access network is based on one or more NodeBs, 40-1 to 40-3, connected to one or more Radio Network Controllers, RNCs 50-1, 50-2. The RNCs 50 may be connected to the core network, e.g. to the MSC 70 and the SGSN 80. The SGSN 80 may further be connected to a Gateway GPRS Support Node, GGSN, 90, according to well-accepted standards.

In E-UTRAN, the access network is based on one or more eNodeBs 60, which may be connected to the core network, e.g. to a Mobility Management Entity, MME, 100. The MME 100 may be connected to a Gateway, GW 110, according to well-accepted standards.

The SGSN 80 may also be connected to the MME 100 and/or the GW 110.

In a first example, the first radio access technology is based on UTRAN, and the second radio access technology is based on GRAN or GERAN, where UTRAN stands for UMTS Terrestrial Radio Access Network, GRAN stands for GSM Radio Access Network, and GERAN stands for GSM EDGE Radio Access Network.

In an optional embodiment, the first cell is a WCDMA cell and the second cell is a GSM or EDGE cell, where WCDMA stands for Wideband Code Division Multiple Access and GSM stands for Global System for Mobile communications, and EDGE stands for Enhanced Data rates for GSM Evolution.

By way of example, the network node may be a Radio Network Controller, RNC, 50 and the RNC 50 receives the information representing the identity of the second cell from a Base Station Controller, BSC, 30, e.g. via the core network. Optionally, there may a direct interface between the RNC 50 and the BSC 30, e.g. in an integrated RNC-BSC node, as indicated by the dashed lines.

In a second example, the first radio access technology is based on UTRAN, and the second radio access technology is based on E-UTRAN, where UTRAN stands for UMTS Terrestrial Radio Access Network and E-UTRAN stands for Evolved UTRAN.

In an optional embodiment, the first cell is a WCDMA cell and the second cell is an LTE cell, where WCDMA stands for Wideband Code Division Multiple Access and LTE stands for Long term Evolution.

By way of example, the network node is a Radio Network Controller, RNC, and the RNC receives the information representing the identity of the second cell from an eNodeB, e.g. via the core network. Optionally, there may a direct interface between the RNC 50 and the eNodeB 60, e.g. in an integrated RNC-eNodeB node, as indicated by the dashed lines.

Proprietary solutions for signaling are also possible.

For a better understanding of the proposed technology, a few non-limiting examples will now be described with reference to FIGS. 5-7.

Figure 5:
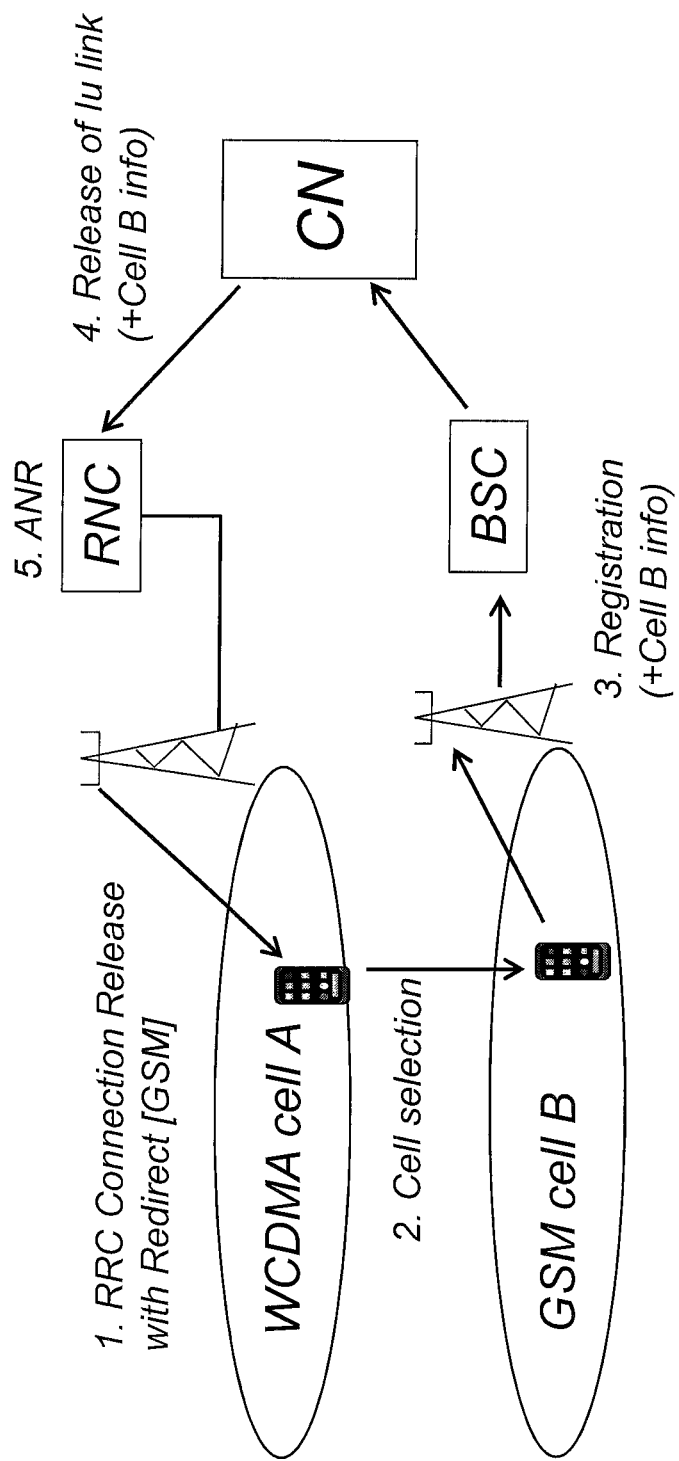
FIG. 5 is a schematic diagram illustrating an example of detection of a neighbor cell relation in the specific context of a WCDMA cell and a GSM cell according to an embodiment.

FIG. 5 is a schematic diagram illustrating an example of detection of a neighbor cell relation in the specific context of a WCDMA cell and a GSM cell according to an embodiment.

In this example, the network is able to detect missing GSM cells and GSM neighbor relations by utilizing the RRC connection release with redirect mechanism. More information on the RRC connection release mechanism in general can be found in reference [2].

By way of example, the UE is initially served by WCDMA cell A, under the control of an RNC. For example, the WCDMA RAN triggers (1) an RRC connection release with redirect to GSM, preferably without releasing the Iu link towards the core network, CN. The UE performs cell selection (2). When the UE has found a suitable cell in GSM it will register (3) there and the source network will be contacted in order to release the Iu link. In this example, the proposed technology enables the BSC to submit (3) GSM cell info such as cell id and possibly other information related to the selected cell, GSM cell B, to the CN. This cell information may be forwarded by the target CN node to the source CN node, if they are different nodes, and the source CN node in turn may send the information to the source RNC node (4). The CN may also contact the source RNC to release the Iu link. This information transfer could be achieved through proprietary BSC/CN/RNC signaling. Optionally, as explained earlier, this information may possibly be transferred more or less directly via a BSC-RNC interface, e.g. in a proprietary BSC-RNC implementation. At reception of this information the RNC will be able to configure the GSM cell, if it is a missing cell, and identify (5) and/or set up a neighbor cell relation between the source UTRAN cell and the target GSM cell.

In this way, it is possible to uniquely detect missing GSM neighbor cells and relations between UTRAN cells and GSM cells.

To summarize one of the possible example embodiments, with reference once again to FIG. 5:

In this example, the UE is connected to Cell A in WCDMA, and Cell B is a GSM cell that initially is not defined as a neighbor to Cell A.

1. The UE is in connected mode in WCDMA cell A. The RNC triggers an RRC Connection Release with redirect to GSM.
2. The UE performs a cell selection process and finds a suitable GSM cell, cell B. More information on cell selection can be found, e.g. in reference [4].
3. The UE registers in the GSM network. The BSC contacts the CN. For example, the identity of GSM cell B may be sent to the CN over the BSC-SGSN interface.
4. The CN contacts the source RNC in order to release the Iu link. The identity of the GSM Cell B may be added in the message sent to the RNC.
   Optionally, the BSC contacts the source RNC directly.
5. The ANR unit in the RNC is now able to detect the neighbor cell relation between WCDMA Cell A and GSM Cell B, if it does not already exist.

Figure 6:
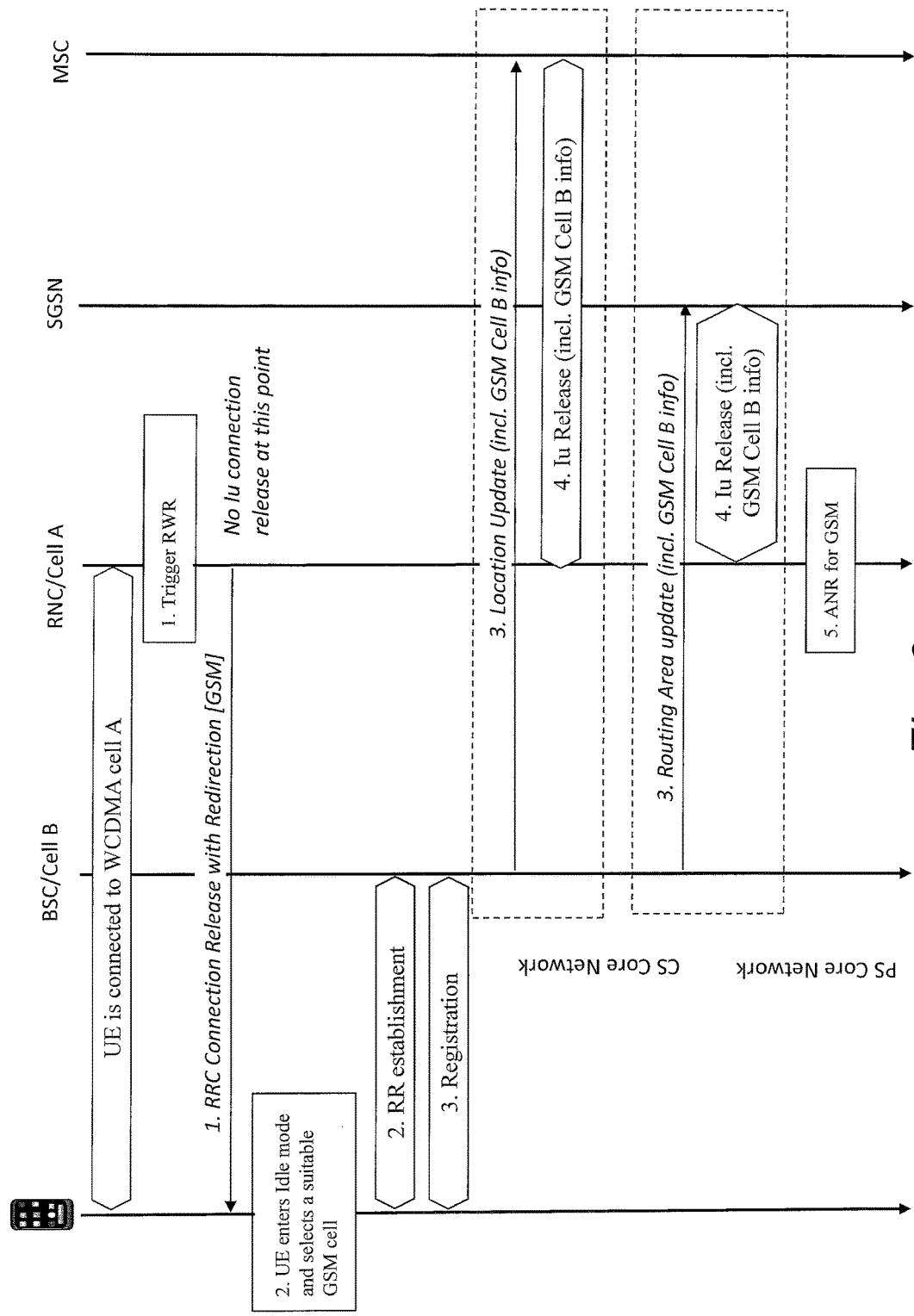
FIG. 6 is a schematic signaling diagram illustrating an example of signaling for detection of a neighbor cell relation between a WCDMA cell and a GSM cell according to an embodiment.

FIG. 6 is a schematic signaling diagram illustrating an example of signaling for detection of a neighbor cell relation between a WCDMA cell and a GSM cell according to an embodiment. In this example, the UE is initially connected to WCDMA Cell A.

1. Trigger the RRC Connection Release procedure with redirection to GSM: The triggering of redirection to GSM is done for the purpose of ANR. By way of example, the triggering can be done at legacy triggering points, which could be for example at data inactivity in order not to disturb the end user. The RNC initiates a RRC Connection Release with Redirection to GSM but the RRC Connection Release message includes no GSM cell identities. Preferably, the Iu connection between the RNC and the CN is kept as well as the UE context with information of source cell and UE id which is kept in the RNC.
2. In this example, the UE follows legacy behavior. It goes to idle mode and searches for GSM. It performs cell selection and camps on a GSM cell; Cell B.
3. The UE performs RR establishment on the radio interface in GSM, and registers in the network with the BSC. It performs Location Area and Routing Area updates, either separately to each core network, Circuit-Switched, CS, core network and/or Packet Switched, PS, core network or as a combined procedure, according the network's mode of operation, e.g. as specified in reference [3]. The BSC sends the Location Area update to the MSC, and/or the BSC sends the Routing Area Update to the SGSN. According to the proposed technology, the BSC adds a package of GSM cell information to any one or both of these update messages, including at least the cell identity of Cell B. Additionally, the package of information may contain: Broadcast Control Channel, BCCH, frequency, Base Station Identity Code, BSIC, and Location Area Code/Routing Area Code, LAC/RAC.
4. The relevant core network node, such as the SGSN and/or MSC, finds the source core network for the UE. In this process, interaction with the Home Location Register, HLR may take place. At least two different configurations are possible:
   i) It is assumed that GSM and WCDMA share the same core network nodes. In this case, the MSC/SGSN may contact the source RNC in order to release the Iu connection. The SGSN submits the package of GSM cell information when it sends Radio Access Network Application Part, RANAP, Iu Release Command [5].
   ii) In case GSM and WCDMA do not share the same core network nodes: In this case, the package of GSM cell information is preferably sent from the source core network node to the target core network node. The target core network node will then submit the package of GSM cell information when it sends RANAP Iu Release Command.
5. In the last step, the RNC has information about the source WCDMA cell and the target GSM cell. In case the target GSM cell is not configured as an external cell in the RNC the information received can be used to automatically create the external GSM cell instance for Cell B. When the GSM cell instance is configured in the RNC, a neighbor cell relation can be automatically created between the UTRAN Cell A and the GSM Cell B.

It is possible to trigger the proposed procedure at selected points in time, for example at low traffic or when the UE activity is assumed to be low. It is also possible to trigger the procedure for only certain kind of UEs, in order not to risk lower throughput for e.g. smartphones during the short time spent in e.g. GSM.

It is also possible to run the procedure more or less directly when neighbor cells are needed immediately, e.g. triggering the procedure automatically when a new radio base station is integrated into the network.

It should be understood that the proposed technology is also applicable between other radio access technologies, and/or in the reverse direction, as explained earlier.

Figure 7:
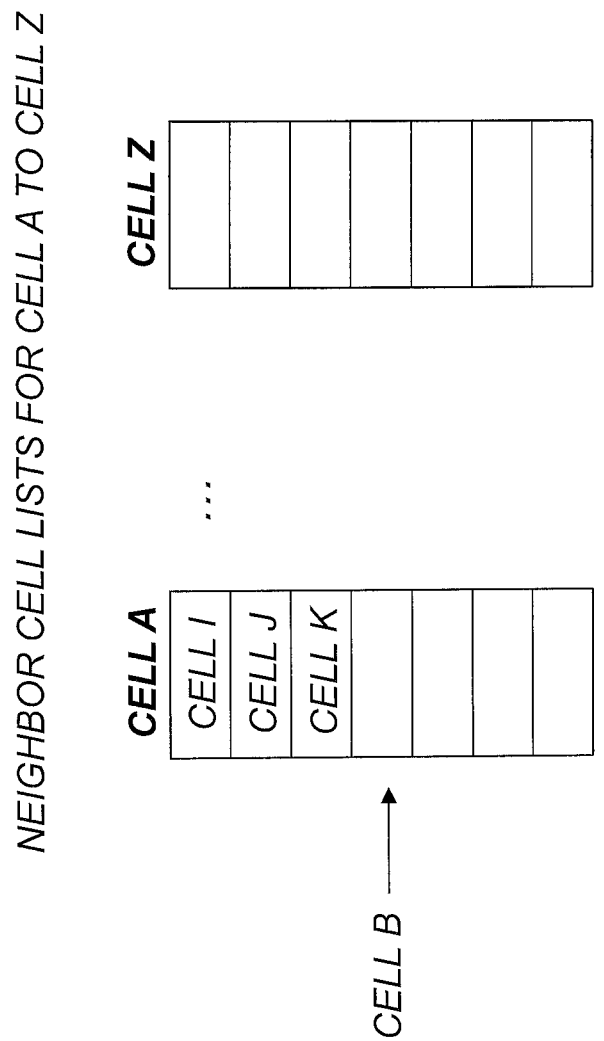
FIG. 7 is a schematic diagram illustrating an example of how to create an instance of a neighbor cell relation according to an embodiment.

FIG. 7 is a schematic diagram illustrating an example of how to create an instance of a neighbor cell relation according to an embodiment. As an example, the neighbor cell relation can be manifested and created as an entry in a neighbor cell list, or equivalent representation of the neighbor cell relations. FIG. 7 shows an example of neighbor cell lists for a number of cells A to Z. For each cell, such as Cell A, there is a list of neighbor cells. In this example, the neighbor cell list for Cell A indicates that Cell A has neighbor relations with Cell I, Cell J, and Cell K. When a new neighbor cell relation is detected for Cell A, an entry of the new cell such as Cell B is created in the neighbor cell list of Cell A, as indicated in the example of FIG. 7.

It can also be appreciated from FIG. 7 that a possible way to check existing neighbor cell relations is to investigate the entries in the neighbor cell list. By way of example, in order to check whether the second cell B is already defined as a neighbor cell of the first cell A, the neighbor cell list of Cell A can be traversed in a search for an entry corresponding to Cell B. If such an entry is not found in the neighbor cell list, Cell B is identified as a new neighbor cell relation, and an entry of Cell B can be made.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

As used herein, the non-limiting terms "User Equipment" or equivalently "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to any relevant network node such as a network control node, a network controller, a radio network controller, a base station controller, a base station and the like.

The proposed technology will now be described with reference to FIG. 1, FIG. 8, FIG. 9 and FIG. 10.

The proposed technology provides a network node 50; 200; 300 configured to detect a neighbor cell relation between different radio access technologies in a cellular communication network. The network node is configured to trigger a User Equipment, UE, 10 served in a first cell of a first radio access technology under the control of the network node, to perform a cell selection process by initiating a connection release with redirection to a second radio access technology, causing the UE to select a second cell of the second radio access technology. The network node 50; 200; 300 is configured to receive information representing the identity of the second cell selected by the UE. The network node 50; 200; 300 is configured to identify, based on the received information representing the identity of the second cell and information representing the identity of the first cell, a neighbor cell relation between the first cell and the second cell.

By way of example, the network node 50; 200; 300 may be configured to identify the neighbor cell relation by checking whether the second cell is defined as a neighbor cell of the first cell, and if the second cell is not defined as a neighbor cell, identifying the second cell as a neighbor cell of the first cell.

In an optional embodiment, the network node 50; 200; 300 may be configured to create an instance of the identified neighbor cell relation between the first cell and the second cell.

For example, the network node 50; 200; 300 may be configured to elect the first cell, from a number of cells serving the UE, to act as a basis relative to which a neighbor cell relation should be identified.

In a particular example, the network node 50; 200; 300 may be configured to initiate the connection release by sending a connection release message without indicating any target cell in the connection release message.

As an example, the network node 50; 200; 300 may be configured to initiate the connection release by sending a Radio Resource Control, RRC, Connection Release message including redirection information for redirection to the second radio access technology.

In an optional embodiment, the network node 50; 200; 300 may be configured to trigger the UE to perform the cell selection process at inactivity.

In another optional embodiment, the network node 50; 200; 300 may be configured to initiate the connection release, while keeping the Iu connection to the core network and UE context with information on the first cell and UE identity, and to release the Iu connection after UE connection establishment in the second cell.

In a particular, non-limiting example, the network node 50; 200; 300 may be a Radio Network Controller, RNC.

As previously indicated, the different radio access technologies may include any pair of GRAN/GERAN, UTRAN and E-UTRAN, where GRAN stands for GSM Radio Access Network, GERAN stands for GSM EDGE Radio Access Network, UTRAN stands for UMTS Terrestrial Radio Access Network and E-UTRAN stands for Evolved UTRAN.

In a first example, the first radio access technology is based on UTRAN, and the second radio access technology is based on GRAN or GERAN, where UTRAN stands for UMTS Terrestrial Radio Access Network, GRAN stands for GSM Radio Access Network, and GERAN stands for GSM EDGE Radio Access Network.

By way of example, the first cell may be a WCDMA cell and the second cell may be a GSM or EDGE cell, where WCDMA stands for Wideband Code Division Multiple Access and GSM stands for Global System for Mobile communications, and EDGE stands for Enhanced Data rates for GSM Evolution.

In an optional embodiment, the network node 50; 200; 300 may be a Radio Network Controller, RNC, and the RNC may be configured to receive the information representing the identity of the second cell from a Base Station Controller, BSC, 30.

In a second example, the first radio access technology is based on UTRAN, and the second radio access technology is based on E-UTRAN, where UTRAN stands for UMTS Terrestrial Radio Access Network and E-UTRAN stands for Evolved UTRAN.

By way of example, the first cell may be a WCDMA cell and the second cell may be an LTE cell, where WCDMA stands for Wideband Code Division Multiple Access and LTE stands for Long term Evolution.

In an optional embodiment, the network node 50; 200; 300 may be a Radio Network Controller, RNC, and the RNC may be configured to receive the information representing the identity of the second cell from an eNodeB 60.

Figure 8:
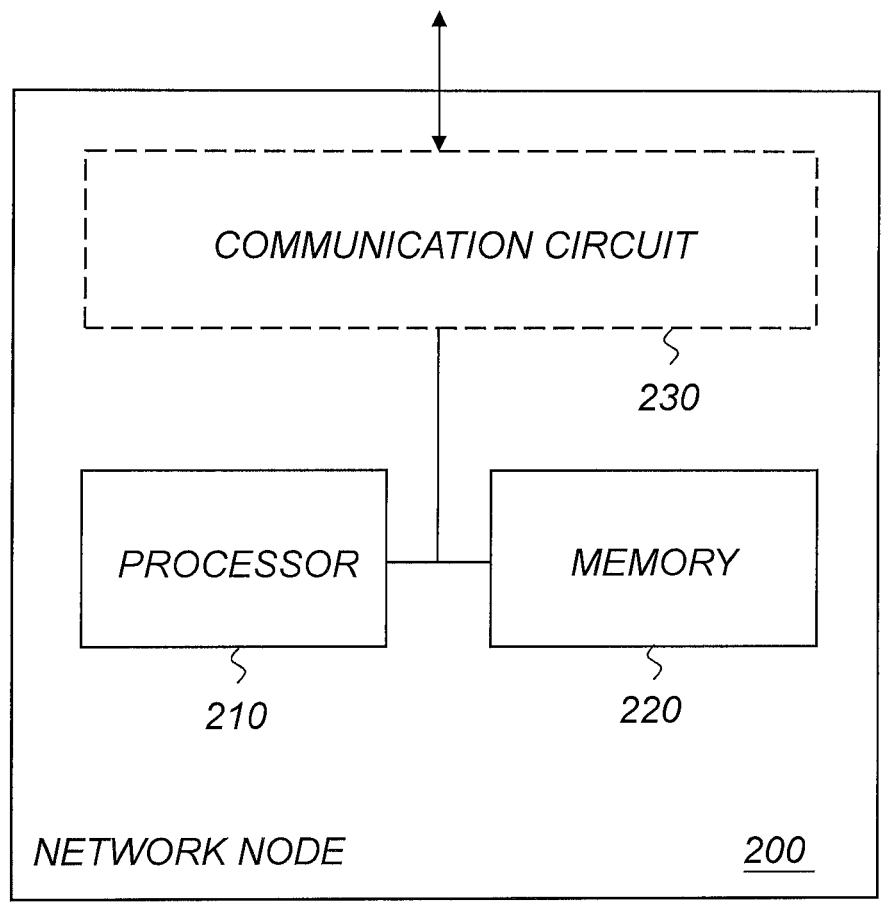
FIG. 8 is a schematic block diagram illustrating an example of a network node configured to detect a neighbor cell relation between different radio access technologies in a cellular communication network according to an embodiment.

FIG. 8 is a schematic block diagram illustrating an example of a network node configured to detect a neighbor cell relation between different radio access technologies in a cellular communication network according to an embodiment.

As exemplified in FIG. 8, the network node may comprise a processor 210 and a memory 220, and the memory 220 comprises instructions executable by the processor 210, whereby the processor 210 is operative to detect a neighbor cell relation.

Optionally, the network node 50; 200 may also include a communication circuit 230. For example, the communication circuit 230 may include functions for wired and/or wireless communication with other devices and/or network nodes in the network. The communication circuit 230 may be interconnected to the processor 210 and/or memory 220.

Figure 9:
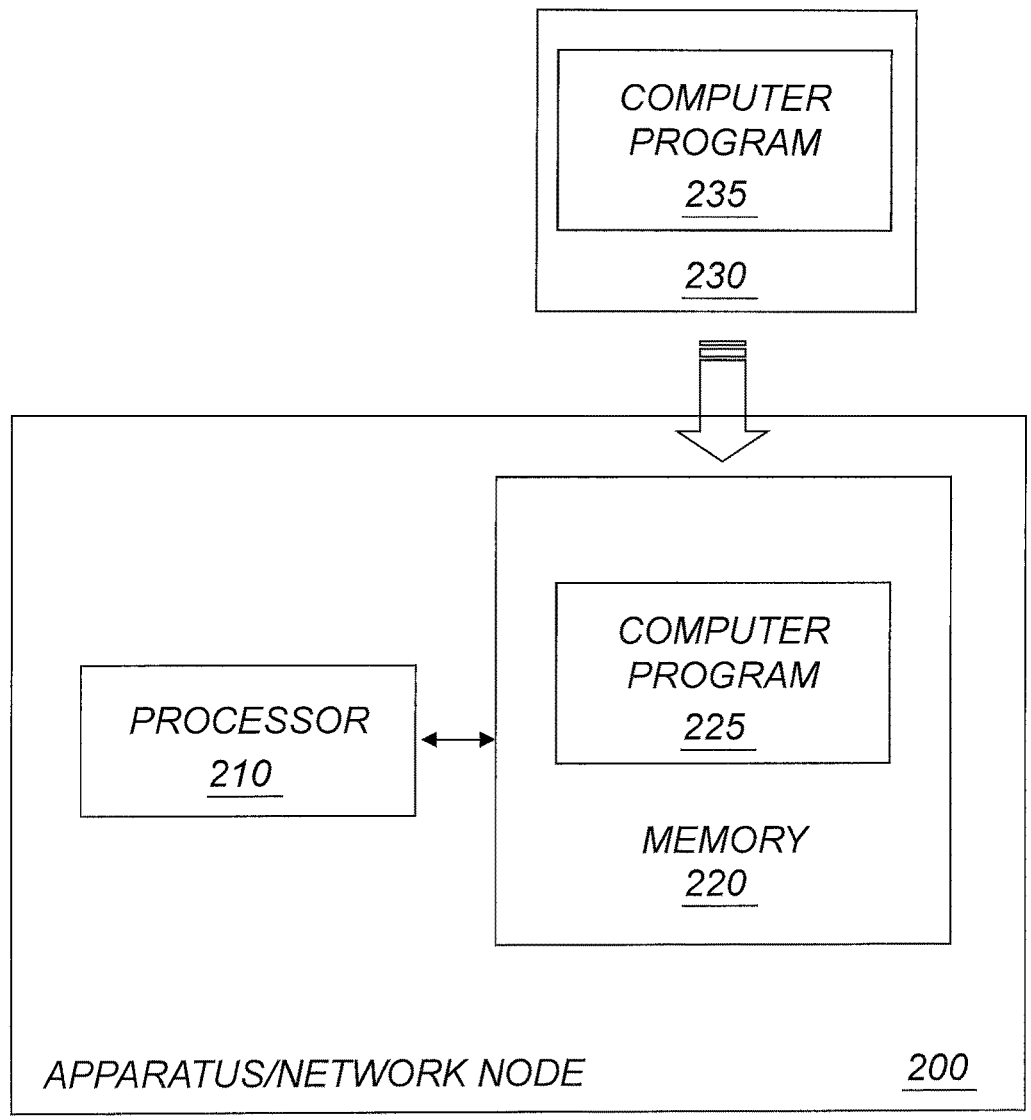
FIG. 9 is a schematic block diagram illustrating an example of an apparatus/network node configured to detect a neighbor cell relation between different radio access technologies in a cellular communication network, as well as a computer program and corresponding computer program product according to an embodiment.

FIG. 9 is a schematic block diagram illustrating an example of an apparatus/network node configured to detect a neighbor cell relation between different radio access technologies in a cellular communication network, as well as a computer program and corresponding computer program product according to an embodiment.

In this example, there is provided an apparatus configured to detect a neighbor cell relation between different radio access technologies in a cellular communication network. The apparatus comprises a processor and a memory, and the memory comprises instructions executable by the processor, whereby the processor is operative to:

trigger a User Equipment, UE, served in a first cell of a first radio access technology, to perform a cell selection process by initiating a connection release with redirection to a second radio access technology, causing the UE to select a second cell of the second radio access technology;

read information representing the identity of the second cell selected by the UE; and identify, based on the information representing the identity of the second cell and information representing the identity of the first cell, a neighbor cell relation between the first cell and the second cell.

In this particular example, at least some of the steps, functions, procedures, modules and/or blocks described herein are thus implemented in a computer program 225; 235, which is loaded into the memory 200 for execution by processing circuitry including one or more processors 210. The processor(s) 210 and memory 220 are interconnected to each other to enable normal software execution. An optional input/output device may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, there is provided a computer program 225; 235 comprising instructions, which when executed by at least one processor, causes the at least one processor to:

trigger a User Equipment, UE, served in a first cell of a first radio access technology, to perform a cell selection process by initiating a connection release with redirection to a second radio access technology, causing the UE to select a second cell of the second radio access technology;

read information representing the identity of the second cell selected by the UE; and identify, based on the information representing the identity of the second cell and information representing the identity of the first cell, a neighbor cell relation between the first cell and the second cell.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium 220; 230.

By way of example, the software or computer program may be realized as a computer program product 220; 230, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram, when performed by one or more processors. A corresponding network node may be defined as a group of function modules, where each step performed by the processor corresponds to a function module. In this case, the function modules are implemented as a computer program running on the processor. Hence, the network node may be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 10:
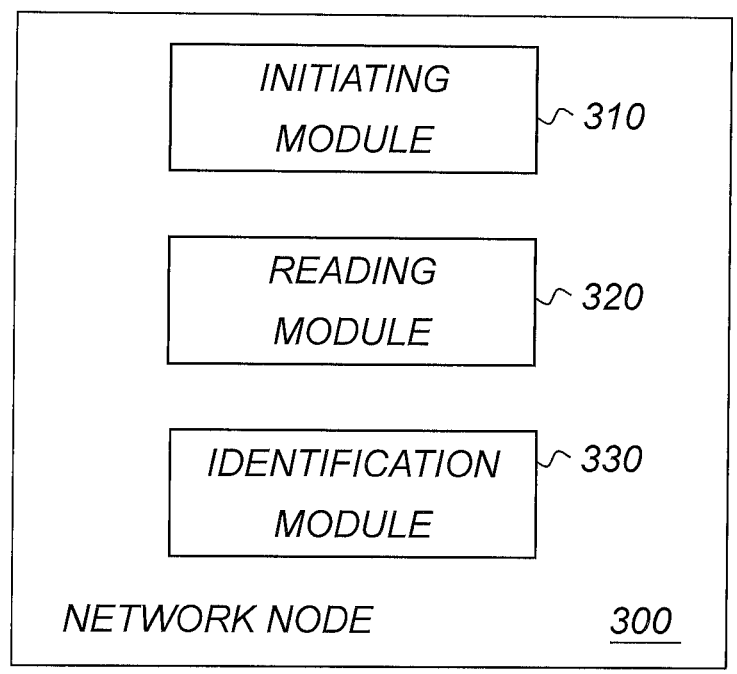
FIG. 10 is a schematic block diagram illustrating an example of a network node for detecting a neighbor cell relation between different radio access technologies in a cellular communication network according to an embodiment.

FIG. 10 is a schematic block diagram illustrating an example of a network node comprising a group of function modules.

In this particular example, there is provided a network node 300 for detecting a neighbor cell relation between different radio access technologies in a cellular communication network. The network node 300 comprises an initiating module 310, a reading module 320 and an identification module 330. The initiating module 310 is adapted for triggering a User Equipment, UE, served in a first cell of a first radio access technology under the control of the network node, to perform a cell selection process by initiating a connection release with redirection to a second radio access technology, causing the UE to select a second cell of the second radio access technology. The reading module 320 is adapted for reading information representing the identity of the second cell selected by the UE. The identification module 330 is adapted for identifying, based on the information representing the identity of the second cell and information representing the identity of the first cell, a neighbor cell relation between the first cell and the second cell.

Alternatively it is possibly to realize the modules in FIG. 10 predominantly by hardware modules, or alternatively by hardware. The extent of software versus hardware is purely implementation selection. The modules, 310, 320, 330 in FIG. 10 are typically implemented by software in combination with hardware. As an option of implementation, the modules, 310, 320, 330, may be implemented by hardware only.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 25.484, VERSION 10.2.0.
[2] 3GPP TS 25.331, VERSION 10.15.0, SECTION 8.5.2.
[3] 3GPP TS 24.008, VERSION 10.13.0, SECTION 4.1.1.4.2, 4.4.1, 4.7.5.
[4] 3GPP TS 25.304, VERSION 10.7.0, SECTION 5.2.3.1.
[5] 3GPP TS 25.413, VERSION 10.10.0, SECTION 8.5.

The invention claimed is:

1. A method, performed by a network node, for detecting a neighbor cell relation between different radio access technologies in a cellular communication network, the method comprising:
triggering a User Equipment (UE), served in a first cell of a first radio access technology under the control of the network node, to perform a cell selection process by initiating a connection release with redirection to a second radio access technology, causing the UE to select a second cell of the second radio access technology; wherein:
the different radio access technologies include any pair of GRAN/GERAN, UTRAN, and E-UTRAN; GRAN stands for GSM Radio Access Network, GERAN stands for GSM EDGE Radio Access Network, UTRAN stands for UMTS Terrestrial Radio Access Network, and E-UTRAN stands for Evolved UTRAN;
the first radio access technology is based on UTRAN, and the second radio access technology is based on GRAN or GERAN;
the first cell is a WCDMA cell and the second cell is a GSM or EDGE cell, where WCDMA stands for Wideband Code Division Multiple Access and GSM stands for Global System for Mobile communications, and EDGE stands for Enhanced Data rates for GSM Evolution;
RNC receives the information representing the identity of the second cell from a Base Station Controller;
receiving information representing the identity of the second cell selected by the UE; wherein:
the information representing the identity of the second cell is received when the core network contacts the RNC to release a Iu link and/or Iu connection; and
identifying, based on the received information representing the identity of the second cell and information representing the identity of the first cell, a neighbor cell relation between the first cell and the second cell.

2. The method of claim 1, wherein the neighbor cell relation is identified by checking whether the second cell is defined as a neighbor cell of the first cell, and if the second cell is not defined as a neighbor cell, identifying the second cell as a neighbor cell of the first cell.

3. The method of claim 1, wherein the connection release is initiated by sending a Radio Resource Control (RRC) Connection Release message including redirection information for redirection to the second radio access technology.

4. The method of claim 1, wherein the network node is a Radio Network Controller.

5. The method of claim 1:
wherein the first radio access technology is based on UTRAN, and the second radio access technology is based on E-UTRAN; and
wherein the first cell is a WCDMA cell and the second cell is an LTE cell, where WCDMA stands for Wideband Code Division Multiple Access and LTE stands for Long term Evolution;
wherein the network node is a Radio Network Controller (RNC) and the RNC receives the information representing the identity of the second cell from an eNodeB.

6. A network node configured to detect a neighbor cell relation between different radio access technologies in a cellular communication network, the network node comprising:
processing circuitry;
memory containing instructions executable by the processing circuitry whereby the network node is operable to:
trigger a User Equipment (UE), served in a first cell of a first radio access technology under the control of the network node, to perform a cell selection process by initiating a connection release with redirection to a second radio access technology, causing the UE to select a second cell of the second radio access technology;
receive information representing the identity of the second cell selected by the UE;
identify, based on the received information representing the identity of the second cell and information representing the identity of the first cell, a neighbor cell relation between the first cell and the second cell;

initiate the connection release, while keeping an Iu connection to the core network and UE context with information on the first cell and UE identity, and to release the Iu connection after UE connection establishment in the second cell; and receive the information representing the identity of the second cell when the core network contacts RNC to release an Iu link and/or the Iu connection.

7. The network node of claim 6, wherein the instructions are such that the network node is operable to identify the neighbor cell relation by checking whether the second cell is defined as a neighbor cell of the first cell, and if the second cell is not defined as a neighbor cell, identifying the second cell as a neighbor cell of the first cell.

8. The network node of claim 6, wherein the instructions are such that the network node is operable to initiate the connection release by sending a connection release message without indicating any target cell in the connection release message.

9. The network node of claim 6, wherein the instructions are such that the network node is operable to initiate the connection release by sending a Radio Resource Control (RRC) Connection Release message including redirection information for redirection to the second radio access technology.

10. The network node of claim 6, wherein the instructions are such that the network node is operable to trigger the UE to perform the cell selection process at inactivity or down-switch between connection states and/or modes.

11. The network node of claim 6, wherein the network node is a Radio Network Controller (RNC), and the RNC is configured to receive the information representing the identity of the second cell from a Base Station Controller.

12. The network node of claim 6, wherein the first radio access technology is based on UTRAN, and the second radio access technology is based on E-UTRAN, where UTRAN stands for UMTS Terrestrial Radio Access Network and E-UTRAN stands for Evolved UTRAN.

13. The network node of claim 12, wherein the network node is a Radio Network Controller, RNC, and the RNC is configured to receive the information representing the identity of the second cell from an eNodeB.

14. The network node of claim 6, wherein the network node further comprises a communication circuit configured to receive the information representing the identity of the second cell.

15. A computer program product stored in a non-transitory computer readable medium for detecting a neighbor cell relation between different radio access technologies in a cellular communication network, the computer program product comprising software instructions which, when run on processing circuitry of the network node, causes the network node to:

trigger a User Equipment (UE), served in a first cell of a first radio access technology under the control of the network node, to perform a cell selection process by initiating a connection release with redirection to a second radio access technology, causing the UE to select a second cell of the second radio access technology;

read information representing the identity of the second cell selected by the UE;

identify, based on the received information representing the identity of the second cell and information representing the identity of the first cell, a neighbor cell relation between the first cell and the second cell;

initiate the connection release, while keeping an Iu connection to the core network and UE context with information on the first cell and UE identity, and to release the Iu connection after the UE connection establishment in the second cell; and receive the information representing the identity of the second cell when the core network contacts RNC to release an Iu link and/or the Iu connection.

16. A network node configured to detect a neighbor cell relation between different radio access technologies in a cellular communication network, the network node comprising:

processing circuitry;

memory containing instructions executable by the processing circuitry whereby the network node is operable to:

trigger a User Equipment (UE), served in a first cell of a first radio access technology under the control of the network node, to perform a cell selection process by initiating a connection release with redirection to a second radio access technology, causing the UE to select a second cell of the second radio access technology;

read information representing the identity of the second cell selected by the UE;

identify, based on the information representing the identity of the second cell and information representing the identity of the first cell, a neighbor cell relation between the first cell and the second;

initiate the connection release, while keeping an Iu connection to the core network and UE context with information on the first cell and UE identity, and to release the Iu connection after the UE connection establishment in the second cell; and receive the information representing the identity of the second cell when the core network contacts RNC to release an Iu link and/or the Iu connection.

* * * * *